J. H. BROOKMIRE.
Improvement in Coffee-Cleaner and Polisher.
No. 132,136.
Patented Oct. 15, 1872.
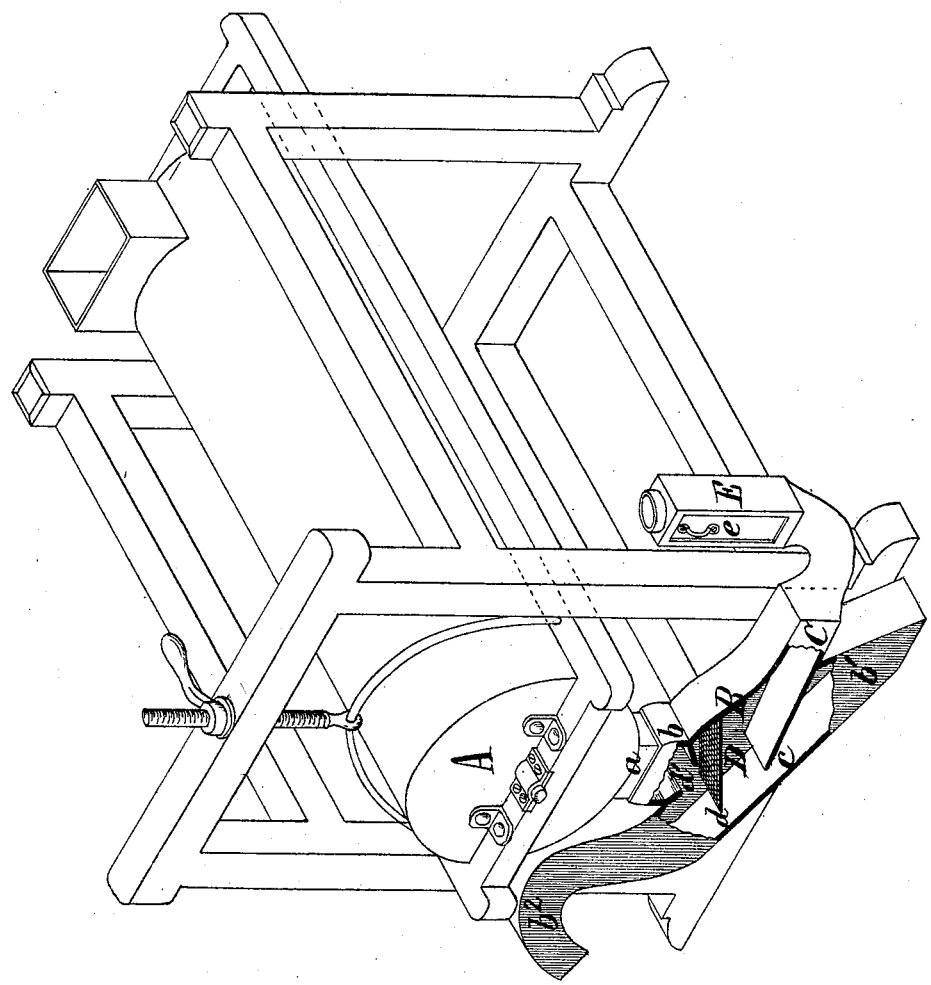
WITNESSES:
Robert Burns.
INVENTOR:
James H. Brookmire
per Herthel & Co
Attorneys.

UNITED STATES PATENT OFFICE.

JAMES H. BROOKMIRE, OF ST. LOUIS, MISSOURI.

IMPROVEMENT IN COFFEE CLEANERS AND POLISHERS.

Specification forming part of Letters Patent No. 132,136, dated October 15, 1872.

*To all whom it may concern:*

Be it known that I, JAMES H. BROOKMIRE, of St. Louis, Missouri, have made a certain new and useful Improved Apparatus for Cleaning and Polishing Coffee; and I do hereby declare that the following is a full and true description thereof, reference being had to the accompanying drawing and to the letters of reference marked thereon.

This invention is an improvement in the process of treating coffee described in Letters Patent of the United States issued to me for machine for treating and polishing coffee, bearing date December 6, 1870, and being numbered 109,865. The object of the improvements here presented is to effect a more perfect, complete, and practical manner of separating the chaff, dirt, dust, and impurities from the coffee after its treatment and discharge from the cylinder of the machine, as described in my Letters Patent as aforesaid. This, to accomplish the nature of my improvements, relates in providing the discharge-hopper of the scouring-cylinder with additional spouting, consisting, chiefly, of a main blast-trunk with screen and branch spouts, arranged in a manner hereafter to be described, by which the coffee is perfectly separated from the improper substances which may be mixed with it after its treatment in the cylinder aforesaid, and the grain or coffee, as well as the different sorts of foreign substances, conveyed to and discharged from separate places and kept distinct from each other. Further, my improvements consist in the manner in which the blast can be regulated in draft by means of a cut-off which connects the blast-trunk to a pressure-blower, all of which will now more fully appear.

To enable those herein skilled to make and use my said improvements, I will now more fully describe the same, referring to—

Figure 1 as a perspective view, showing my improved spouting combined with cylinder and part of casing removed, showing interior chambers of the trunk.

A represents the cylinder. The said cylinder A is arranged, supported, and has its beaters operated in the manner described in my Letters Patent above referred to. As stated in the nature of this improvement, to the discharge-chute $a$ of the cylinder is added in communication a blast-trunk, B, by its branch spout $b$. The trunk B is formed to consist of the main discharge $b^1$ for the clean coffee, the impurities, &c., discharging out of the curved part $b^2$ downward, as shown. C is a branch spout, forming part of the trunk B, for conveying the blast into same. As shown, the spout C enters and partly divides the trunk diagonally, a clearance, $c$, being left for the passage and discharge of the clean grain or coffee. Through the spout C the blast is directed to strike the coffee as the same enters the trunk B. D is a suitable screen, arranged and properly secured in trunk B; also a clearance, $d$, is left for the free passage of the separated coffee. The screen D causes the coffee to drop vertically to bottom passage of the trunk; at the same time checks all foreign matter which by force of the blast is driven out of the curved discharge $b^2$ of the trunk. $d'$ are inward-projecting flanges to catch and scatter the grains of coffee. The blast-spout C, by proper elbow-joint, connects with a cut-off, E. Said cut-off chiefly consists of a square spouting, one side of which forms a hinged door, $e$, opening and closing inwardly. To the top of the cut-off the communication is made with a suitable pressure-blower, or other adapted blast source. The object of the hinged door or cut-off E proper is to regulate and graduate the draft of blast introduced to be in accordance with the nature and requirements of the coffee treated.

It is evident, by graduating the opened condition of the door $e$, the superfluous blast can be dispensed with, or the entire and full force of the blast used by closing the door of the cut-off. Thus the coffee, together with whatever impurities it is mixed, after treatment in the cylinder A discharges in the trunk, is scattered, and meets the blast from pressure-blower through the spout C, which drives the chaff, dirt, and other light impurities out of the curved end of the trunk; the separated or cleaned coffee in the meantime escapes through the clearances and passes along the bottom of the trunk and out of same into a proper receptacle.

Having thus fully described my said improvements, what I claim is—

1. The trunk B provided with screen D, flanges $d'$, blast-spout C, chute $a$, arranged in combination with cylinder A, substantially as and for the purpose set forth.

2. A cut-off, E, having hinged door $e$, arranged in combination with blast-trunk B, as and for the purpose set forth.

3. The combination of the trunk B, screen D, flanges $d'$, chute $a$, blast-spout C, cut-off E, and cylinder A, all constructed to operate as and for the purpose set forth.

In testimony of said invention I have hereunto set my hand.

JAS. H. BROOKMIRE.

Witnesses:
WILLIAM W. HERTHEL,
ROBERT BURNS.